F. J. BRADBERRY.
REVERSING GEAR.
APPLICATION FILED DEC. 28, 1909.
964,382.
Patented July 12, 1910.
2 SHEETS—SHEET 1.
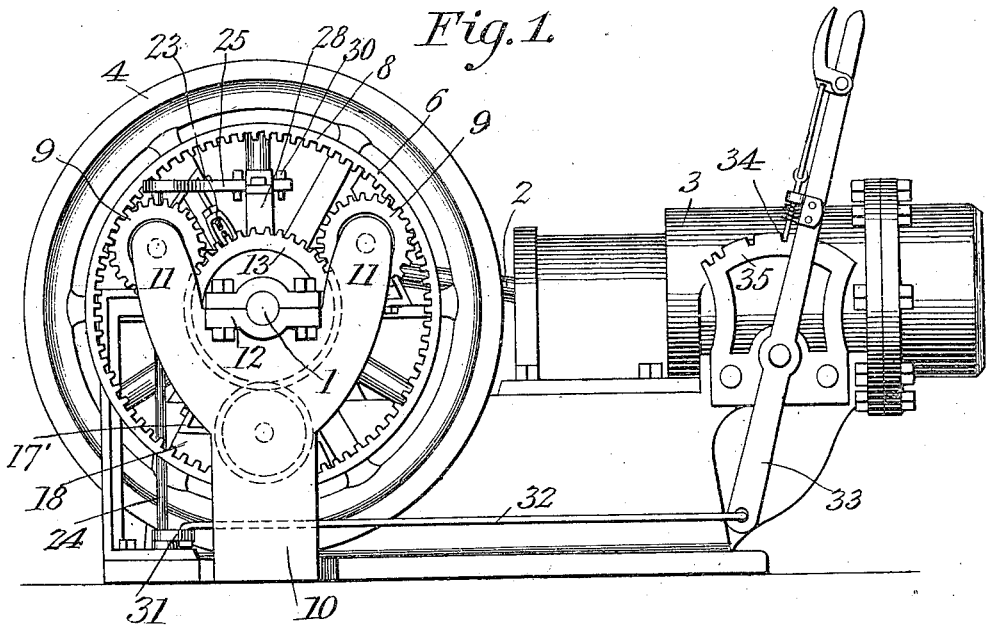
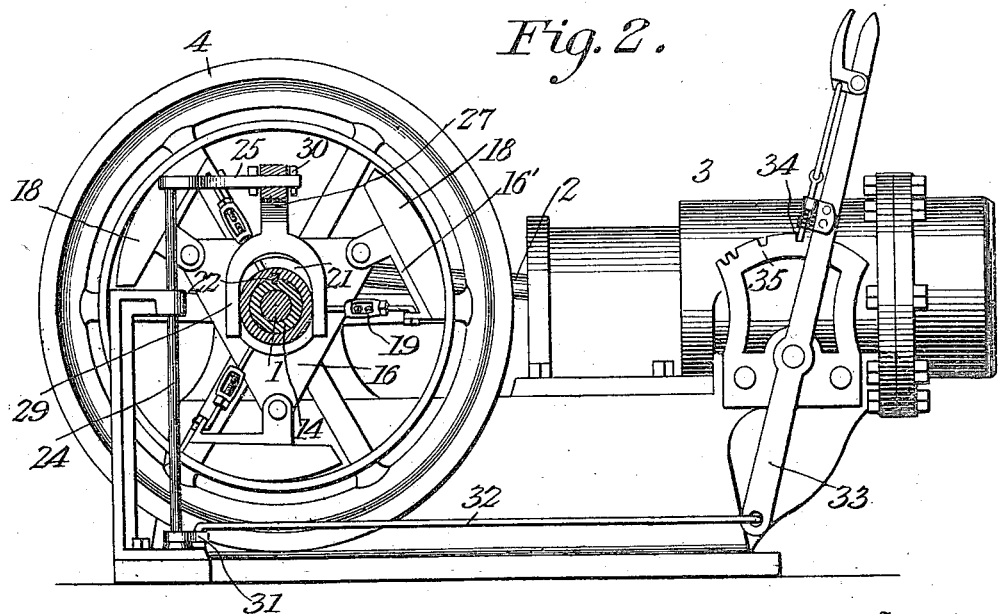
Witnesses
Phil E Barius
Wm Bagger
Inventor
F. J. Bradberry.
By Victor J. Evans
Attorney

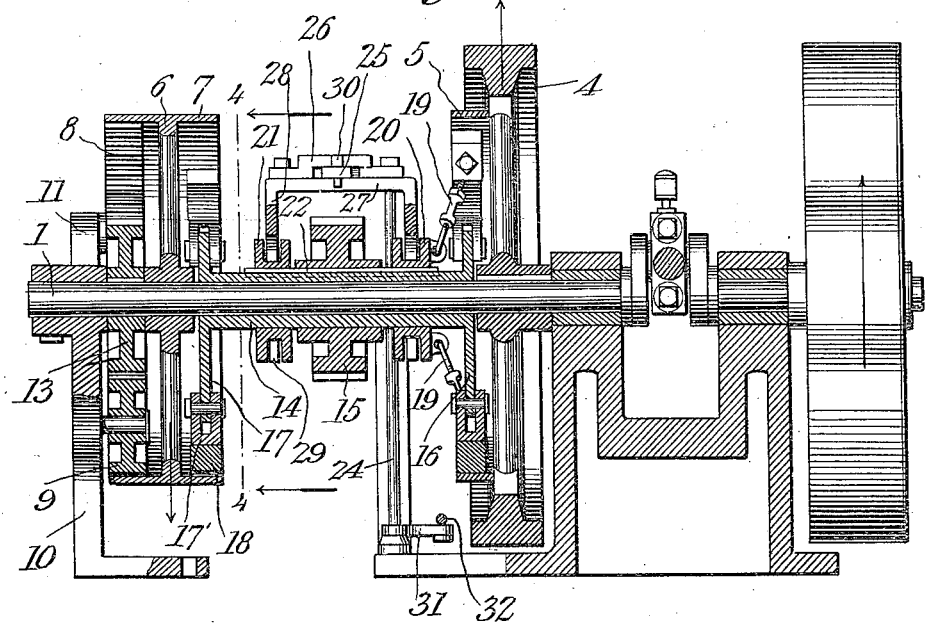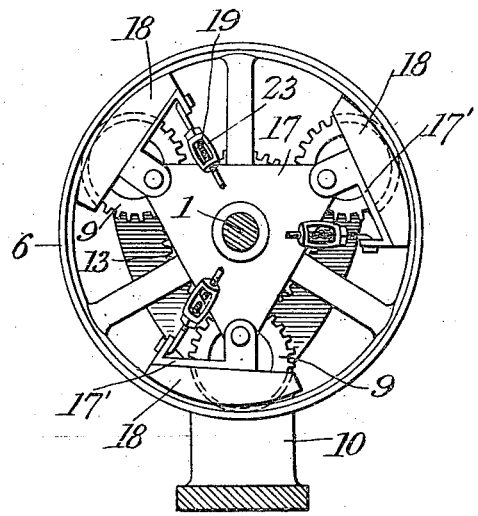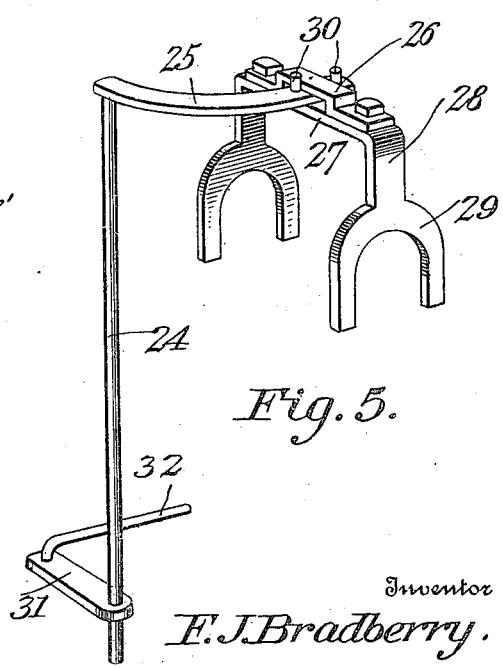

UNITED STATES PATENT OFFICE.

FREDERICK J. BRADBERRY, OF MITCHELL, SOUTH DAKOTA.

REVERSING-GEAR.

964,382.　　　　Specification of Letters Patent.　Patented July 12, 1910.

Application filed December 28, 1909. Serial No. 535,339.

*To all whom it may concern:*

Be it known that I, FREDERICK J. BRAD-BERRY, a citizen of the United States of America, residing at Mitchell, in the county of Davison and State of South Dakota, have invented new and useful Improvements in Reversing-Gear, of which the following is a specification.

This invention relates to devices for reversing motion and which are generally known as reversing gear, and the invention has for its object to provide a device of simple and improved construction by means of which the direction of rotation of a transmission wheel or pulley may be quickly and efficiently reversed without undue shock or vibration.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

In the drawings,—Figure 1 is a side elevation, showing the improved reversing gear applied to the crank shaft of an engine or motor. Fig. 2 is a sectional elevation of the same. Fig. 3 is a vertical sectional view taken longitudinally on the crank shaft. Fig. 4 is a sectional detail view taken on the plane of the line 4—4 in Fig. 3. Fig. 5 is a perspective detail view of a portion of the reversing mechanism.

Corresponding parts in the several figures are denoted by like characters of reference.

The invention has been shown as applied to a crank shaft 1 driven by the pitman rod 2 of an engine or motor 3 which may be of any desired type. The shaft 1 carries a fly wheel 4 which is firmly keyed upon said shaft, said fly wheel being equipped with a friction rim 5. A pulley 6, which is loosely mounted upon the shaft 1, at a suitable distance from the fly wheel 4, includes a friction rim 7 and an internal gear 8, the latter being in mesh with a plurality of pinions 9 mounted upon an upright 10 and upon arms 11 extending from said upright, the latter being also equipped with a box 12 constituting one of the bearings for the crank shaft 1. The latter carries a spur wheel 13 which is also in mesh with the pinions 9, said pinions serving to transmit motion to the pulley 6 in a reverse direction to that of the crank shaft.

A sleeve 14, which is loosely mounted upon the shaft 1 intermediate the fly wheel 4 and the pulley 6, carries a transmission wheel 15 which may be either a gear wheel, a band wheel, or a sprocket wheel, according to the nature of transmission used, said transmission wheel being fixed upon the sleeve for rotation therewith. The sleeve also carries adjacent to the ends thereof a pair of disks 16 and 17 which are located adjacent to the fly wheel 4 and the pulley 6, respectively, each of said disks being equipped with a plurality of pivotally supported brackets 16' and 17' carrying friction shoes 18. The brackets 16' and 17' are connected by means of links 19 with circumferentially grooved disks 20 and 21 which are slidably mounted upon the sleeve 14 with which they are connected for rotation by means of a key or spline 22. The links 19 are preferably equipped with turn buckles 23 in order that they may be conveniently adjusted as to length.

A rock shaft 24, which is suitably supported for oscillation in an approximately vertical position, is provided at one end with an arm 25 engaging a keeper 26 upon a cross bar 27 carrying at the ends thereof downwardly extending arms 28 having terminal yokes 29 that engage the circumferential grooves of the disks 20 and 21, which latter, by oscillating the rock shaft, may be moved longitudinally of the sleeve 14. The arm 25 is provided with upstanding pins 30, whereby it is retained in the keeper. The rock shaft is also provided with a radially extending arm or crank 31 which is connected by a link 32 with a hand lever 33, whereby it may be rocked or oscillated, said hand lever being provided with a spring-actuated stop member 34 engaging a notched plate 35, whereby the parts may be retained in position at various adjustments.

It will be readily seen that the fly wheel 4, being keyed upon the crank shaft, will rotate in the direction of the latter, thus communicating motion in the same direction to the sleeve 14 and the transmission wheel 15 when the friction shoes 18 carried by the brackets 16' are in engagement with the friction rim 5 of said fly wheel, this position being maintained when the circumferentially grooved pulleys 20 and 21 are moved in the direction of the fly wheel by the shifting mechanism, including the yokes 29, the rock shaft 24 and related parts, the links 19 serving to force the friction shoes carried by the brackets 17 into engagement with the rim 5, as will be readily understood, while the friction shoes carried by the brackets 17 are swung or moved to a non-engaging position with reference to the friction rim 7 of the pulley 6. When the circumferentially grooved disks 20 and 21 are moved in the direction of the pulley 6, the friction shoes will be disengaged from the friction rim 5, and the friction shoes carried by the brackets 17' will now be placed into active engagement with the rim 7 which is rotated in a reverse direction to the shaft 1 by the intermediate gearing including the pinions 9, and it follows that the sleeve 14 carrying the transmission pulley will now be rotated in a reverse direction. By shifting the circumferentially grooved pulleys 20 and 21 to a position intermediate the limits of its movement, the friction shoes connected with the disks 16 and 17 at both ends of the sleeve 14 will be thrown out of engagement with the respective friction rims, and motion of the transmission wheel 15 will thus be stopped.

Having thus described the invention, what is claimed as new, is:—

In a device of the character described, a driven shaft, a fly wheel fixed upon the shaft and having a friction rim, a pulley loosely engaging the shaft and having a friction rim, means for transmitting motion in a reverse direction from the shaft to the pulley, a sleeve loosely engaging the shaft intermediate the fly wheel and the pulley and having terminal disks, brackets pivotally engaging the disks, friction shoes carried by the brackets and adapted to engage the respective friction rims, circumferentially grooved disks slidable upon and rotatable with the sleeve, links connecting said disks with the friction shoe carrying brackets, a transmission wheel keyed upon the sleeve, and means for simultaneously shifting the circumferentially grooved disks in either direction.

In testimony whereof I affix my signature in presence of two witnesses.

FREDERICK J. BRADBERRY.

Witnesses:
 H. R. KIBBEE,
 R. E. CONE.